Patented Jan. 10, 1933                                          1,893,846

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

RUBBER VULCANIZATION PROCESS

No Drawing.        Application filed May 16, 1928. Serial No. 278,350.

The present invention relates to the vulcanization of rubber by an improved process whereby a vulcanized product of high quality is produced. More particularly, the invention relates to the curing of rubber by employing a mixture of accelerators in the vulcanization step. Such mixtures preferably comprise an accelerator of weakly acid nature with an accelerator of basic nature, each of which is relatively slow acting in the early stages of the cure but which mixture or a reaction product thereof, produced during the cure is particularly active. By these means, a powerful accelerator is capable of employment in a rubber mix in such a manner that no difficulties are encountered in processing the rubber stocks in the factory due to the desirable delayed accelerating action possessed by the mixture. As is disclosed hereinafter, it has been found that mixtures comprising an aryl thiazole disulfid with a basic accelerating agent exert a far more powerful action in the vulcanization of rubber than do any of the components of the mixture and likewise exhibit desirable delayed action characteristics.

Mercapto-benzo-thiazole-disulfid is an example of a thiazole disulfid which is a mild accelerator of the vulcanizing process particularly during the early stages of the cure. Diphenyl-guanidine is an accelerator of basic nature which is also relatively slow in exerting accelerating action in the cure. It has now been found that mixtures of these two accelerators, as well as mixtures of other basic compounds with thiazole disulfids as hereinafter disclosed, accelerate the vulcanizing step much more vigorously in the early stages of the cure and produce a vulcanized product at full cure that possesses much more desirable physical and commercial characteristics than do any of the components of the mixture when employed separately in a rubber mix.

The preferred means of carrying out the invention, and the desired results realized thereby are fully set forth and will be understood from the following examples.

Rubber stocks were prepared in the usual manner comprising

|                    | Parts |
|--------------------|-------|
| Smoked sheet rubber | 100  |
| Zinc oxide          | 5    |
| Sulfur              | 3.5  |
| Accelerator         | 0.5  |

As accelerators there were used 0.5 parts of diphenyl-guanidine in one stock (indicated below as A); in a second stock 0.5 parts of mercapto-benzo-thiazole-disulfid was used (indicated below as B); and in a third stock a mixture of 0.25 parts of diphenyl-guanidine and 0.25 parts of mercapto-benzo-thiazole-disulfid was used (indicated below as stock C).

The various stocks were then vulcanized by heating portions thereof for the times indicated in a press maintained under the temperature of forty pounds of steam pressure per square inch. The various samples, cured under the conditions described, were then tested and the following results were obtained:

| Stock | Time of cure at 40 lbs. steam pressure | Modulus of elasticity in lbs/in² at elongations of— | | | Tensile strength at break in lbs/in² | Ultimate elongation |
|---|---|---|---|---|---|---|
| | | 300% | 500% | 700% | | |
| | Minutes | | | | | |
| A | 15 | 101 | 190 | 460 | 1445 | 925 |
| B | 15 | 139 | 250 | 678 | 2295 | 920 |
| C | 15 | 343 | 574 | 2445 | 4280 | 815 |
| A | 30 | 151 | 327 | 1280 | 2765 | 860 |
| B | 30 | 181 | 341 | 1050 | 2633 | 870 |
| C | 30 | 307 | 720 | 2960 | 4220 | 775 |
| A | 45 | 198 | 418 | 1665 | 3430 | 830 |
| B | 45 | 189 | 373 | 1108 | 3130 | 880 |
| C | 45 | 313 | 748 | 3105 | 4400 | 790 |

The above results show that the mixture of accelerators is more active at all the cures set forth than are either of the components of the mixture when used separately. Another advantage resulting from the use of a mixture of accelerators of the type set forth is that there is a decided delayed action exhibited, particularly at cures carried out at lower temperatures. In other words, although the mixture of accelerators is very active and produces stocks of high quality at full cure, yet at lower temperatures, and particularly at those temperatures to which stock is subjected in the milling operation, the mixture is very much less active so that there is no scorching of the stock during milling. The same beneficial results are shown when other basic accelerating compounds are employed in place of diphenyl-guanidine set forth in the example.

The effect of varying proportions of the components of a mixture of accelerators of the preferred type is illustrated by the following example. A rubber stock was compounded comprising

| | Parts |
|---|---|
| Pale crepe rubber | 100 |
| Zinc oxide | 5 |
| Sulfur | 2 |
| Accelerator | 0.5 |

As accelerators there were used the indicated quantities of a mixture of one molecular proportion (332 parts) of mercapto-benzo-thiazole-disulfid with one molecular proportion (211 parts) of diphenyl-guanidine (stock C below); a second accelerator comprised a mixture of one molecular proportion (332 parts) of mercapto-benzo-thiazole-disulfid with two molecular proportions (422 parts) of diphenyl-guanidine (stock D below); and a third accelerator comprised a mixture of one molecular proportion (332 parts) of mercapto-benzo-thiazole-disulfid with three molecular proportions (633 parts) of diphenyl-guanidine (stock E below).

The various stocks compounded according to the formulæ set forth, were then vulcanized and the products tested. The physical characteristics of the stocks cured in a press under different temperature conditions were as follows:

| Stock | Time of cure | Modulus of elasticity in lbs/in$^2$ at elongations of | | | Tensile strength in lbs/in$^2$ at break | Ultimate elongation per cent |
|---|---|---|---|---|---|---|
| | | 300% | 500% | 700% | | |
| C | 30 min. at 10 pounds steam pressure per sq. in. | No cure | No cure | No cure | No cure | No cure |
| D | do | 45 | 72 | 117 | 529 | 1090 |
| E | do | 79 | 132 | 293 | 1010 | 960 |
| C | 1 hour at 10 pounds steam. | 133 | 320 | 1020 | 2490 | 890 |
| D | do | 142 | 311 | 1220 | 2750 | 880 |
| E | do | 166 | 372 | 1205 | 2610 | 840 |
| C | 60 min. at 20 pounds steam. | 178 | 480 | 2180 | 3430 | 800 |
| D | do | 175 | 574 | 2115 | 3275 | 790 |
| E | do | 204 | 543 | 1920 | 3280 | 793 |
| C | 15 min. at 40 pounds steam. | 132 | 383 | 1505 | 2810 | 820 |
| D | do | 163 | 404 | 1555 | 3055 | 830 |
| E | do | 161 | 387 | 1435 | 2815 | 830 |
| C | 30 min. at 40 pounds steam. | 175 | 472 | 1825 | 3240 | 800 |
| D | do | 165 | 476 | 1970 | 3420 | 810 |
| E | do | 252 | 629 | 2240 | 3220 | 780 |
| C | 45 min. at 40 pounds steam. | 204 | 511 | 1920 | 3040 | 810 |
| D | do | 199 | 482 | 1910 | 3265 | 790 |
| E | do | 223 | 398 | 2170 | 3140 | 780 |

The above results show that the accelerating action of the mixture of accelerators is not greatly affected by changing the ratio of the base to the disulfid in the mixture. Thus, the accelerating action of a mixture of mercapto-benzo-thiazole-disulfid and diphenyl-guanidine in equi-molecular proportion is substantially the same as when a mixture in the ratio of one mol of the former to two or three mols of the latter is employed. The results also show the relatively slight accelerating action of the mixtures during the first stages of the cure.

Thus, the action in the cure carried out by heating for thirty minutes in a press under ten pounds of steam pressure is apparently very slight. This indicates that there is a certain time lag that exists in the cure before the mixture of accelerators exerts its effect. Such lag is, of course, more evident at the cures carried out under the lower temperature conditions. In other words, the mixture of accelerators is of the type known as a delayed action accelerator, that is, there is a period in the early stages of the cure during which the mixture is less active than at other times. This is undoubtedly due to the fact that in the early stage of the cure the components of the mixture of accelerators have not reacted to any perceptible extent and the maximum accelerating action of the mixtures is not exerted until such reaction has taken place and the most active accelerator produced. Serious scorching on the mills and other difficulties produced by prevulcanization of the stock are usually caused if a reaction product be employed of the mixture of accelerators set forth, preformed and added to the stock in the milling step. A very active accelerator that possesses delayed action characteristics is most desirable for use in the vulcanization step. The mixtures set forth are seen to possess this property.

A further example of the use of the mixture of accelerators hereinbefore set forth in a tire tread stock is the following. A compound was milled in the usual manner comprising

| | Parts |
|---|---|
| Smoked sheet rubber | 34 |
| Pale crepe rubber | 20 |
| Carbon black | 22 |
| Zinc oxide | 17.75 |
| Mineral rubber | 3.0 |
| Sulfur | 1.75 |
| Diphenyl-guanidine | 0.40 |
| Mercapto-benzo-thiazole-disulfid | 0.40 |
| A blended mineral and vegetable oil | 1.0 |

The stock was then cured in a press maintained at curing temperatures by means of steam under pressure and the cured samples were then tested and the following results obtained:

| Temp. of cure | Time of cure | Modulus of elasticity in lbs/in$^2$ at elongations of | | | Tensile at break in lbs/in$^2$ | Ultimate elongation % |
|---|---|---|---|---|---|---|
| | | 300% | 500% | 700% | | |
| 258° C | 45 min | 1253 | 3033 | | 4315 | 650 |
| Do | 1 hour | 1405 | 3140 | | 4203 | 645 |
| Do | 2 hours | 1610 | 3425 | | 4150 | 590 |
| 274° C | 30 min | 1343 | 3085 | | 4150 | 590 |
| Do | 1 hour | 1485 | 3258 | | 4025 | 605 |
| Do | 1½ hours | 1553 | 3248 | | 4045 | 590 |

The above results show that a high grade tread stock was produced by means of the mixture of accelerators set forth.

A standard cushion stock comprising a mixture of

| | Parts |
|---|---|
| Pale crepe rubber | 100 |
| Sulfur | 3 |
| Zinc oxide | 25 |
| Diphenyl-guanidine | 0.25 |
| Mercapto-benzo-thiazole-disulfid | 0.25 | was mixed, cured and tested in the manner hereinbefore set forth and the following results were obtained:

| Temp. of cure | Time of cure | Modulus of elasticity in lbs/in² at elongations of | | | Tensile at break in lbs/in² | Ultimate elongation % |
|---|---|---|---|---|---|---|
| | | 300% | 500% | 700% | | |
| 239° F | 1½ hours | 368 | 1170 | 3720 | 4423 | 770 |
| 258° F | 30 min | 287 | 763 | 2653 | 4098 | 815 |
| Do | 1 hour | 357 | 1013 | 3360 | 4235 | 775 |

It is apparent from the above results that a high quality cushion stock is obtained by employing the mixture of accelerators set forth.

A hard rubber stock was also prepared comprising

| | Parts |
|---|---|
| Pale crepe rubber | 100 |
| Sulfur | 45 |
| Zinc oxide | 10 |
| Lime | 5 |
| A mixture of equal parts by weight of diphenyl-guanidine with mercapto-benzo-thiazole-disulfid | 1.5 |

The stock was found to yield a good hard rubber after curing under forty pounds steam pressure for from 1¾ to 2¼ hours.

Other tests have also been carried out wherein different bases have been substituted in place of the diphenyl-guanidine employed in the examples hereinbefore set forth. Thus, rubber stocks were prepared in the usual manner comprising:

| | Parts |
|---|---|
| Pale crepe rubber | 100 |
| Zinc oxide | 5 |
| Sulfur | 2 |
| Accelerator | 0.5 |

As an accelerator there was employed in stock F, the quantity set forth of a mixture of 332 parts (one molecular proportion) of mercapto-benzo-thiazole-disulfid with 508 parts (two molecular proportions) of phenyl-p-dimethyl-amino-phenyl-guanidine; in stock G there was incorporated the indicated quantity of a mixture of 332 parts (one molecular proportion) of mercapto-benzo-thiazole-disulfid with 398 parts (two molecular proportions) of 2-4 diamino-diphenylamine; and in stock H there was employed the quantity set forth of a mixture of 332 parts (one molecular proportion) of mercapto-benzo-thiazole with 172 parts (two molecular proportions) of piperazine. Portions of the various stocks were then cured by heating in a press under different temperature conditions and the vulcanized stocks tested and the following results obtained:

| Stock | Temp. of cure | Time of cure | Modulus of elasticity in lbs/in² at elongations of | | | Tensile strength at break in lbs/in² | Ultimate elongation % |
|---|---|---|---|---|---|---|---|
| | | | 300% | 500% | 700% | | |
| F | 239° F | 30 min | 120 | 237 | 782 | 2035 | 880 |
| G | do | do | No cure | No cure | No cure | No cure | No cure |
| H | do | do | No cure | No cure | No cure | No cure | No cure |
| F | do | 1 hour | 194 | 484 | 1825 | 3175 | 820 |
| G | do | do | 80 | 159 | 558 | 1990 | 950 |
| H | do | do | 87 | 173 | 582 | 1990 | 940 |
| F | 258° F | 60 min | 242 | 595 | 2425 | 3310 | 760 |
| G | do | do | 135 | 342 | 1195 | 2765 | 870 |
| H | do | do | 129 | 351 | 1160 | 2725 | 850 |
| F | 287° F | 15 min | 215 | 519 | 1970 | 2908 | 760 |
| G | do | do | 145 | 259 | 763 | 1900 | 860 |
| H | do | do | 139 | 286 | 940 | 2110 | 860 |
| F | do | 30 min | 268 | 728 | 2600 | 3570 | 763 |
| G | do | do | 142 | 309 | 1125 | 2435 | 800 |
| H | do | do | 141 | 327 | 1060 | 2310 | 850 |

The above results show that desirable delayed action accelerating mixtures are produced in all cases, although the mixture of the disulfid and the substituted guanidine employed is much more active than are either of the two other mixtures tested. Higher tensile strengths could readily be obtained in the case of the stocks tested by employing a high proportion of sulfur or by using a larger quantity of the mixture of accelerators in the preparation of the stocks.

Other tests have been carried out wherein other mixtures of accelerators have been employed. Thus, a mixture of 360 parts (one molecular proportion) of mercapto-p-tolyl-thiazole-disulfid with 384 parts (two molecular proportions) of o-tolyl-biguanide and also a mixture of 360 parts (one molecular proportion) of mercapto-p-tolyl-thiazole-disulfid with 370 parts (two molecular proportions) of tri-butylamine were compounded in rubber stocks comprising

| | Parts |
|---|---|
| Pale crepe rubber | 100 |
| Zinc oxide | 5 |
| Sulfur | 2 |
| Accelerator | 0.5 |

Both stocks were found to exhibit the same delayed action characteristic of the mixture hereinbefore set forth at the lower temperature conditions and to possess accelerating power under the curing conditions normally employed.

The examples hereinbefore set forth are to be understood as illustrative only and not at all limitative of the invention. Other ingredients and other proportions of ingredients than those employed in the examples may be incorporated into rubber stocks designed for various types of products as are apparent from the foregoing to one skilled in the art of rubber compounding. Moreover, the invention is not to be considered as dependent upon the accuracy of any theories advanced in explanation of the changes taking place, but is limited solely by the following claims wherein the invention is claimed as broadly as possible in view of the prior art.

What is claimed is:

1. The method of manufacturing a vulcanized rubber product which comprises heating rubber and sulfur in the presence of an accelerating agent, said agent comprising a mixture of a benzo-thiazole-disulfid accelerator and an accelerator containing a substituted amino grouping.

2. The method of mnufacturing a vulcanized rubber product which comprises heating rubber and sulfur in the presence of an accelerating agent, said agent comprising a mixture of a mercapto-benzo-thiazole-disulfid accelerator and an accelerator containing a substituted amino grouping.

3. The method of manufacturing a vulcanized rubber product which comprises heating rubber and sulfur in the presence of an accelerating agent, said agent comprising a mixture of an aryl thiazole disulfid accelerator and an accelerator containing a substituted amino grouping.

4. The method of manufacturing a vulcanized rubber product which comprises heating rubber and sulfur in the presence of an accelerating agent, said agent comprising a mixture of an aryl thiazole disulfid accelerator and a di-substituted guanidine accelerator.

5. The method of manufacturing a vulcanized rubber product which comprises heating rubber and sulfur in the presenec of an accelerating agent, said agent comprising a mixture of an aryl-thiazole-disulfid accelerator and a di-aryl substituted guanidine accelerator.

6. The method of manufacturing a vulcanized rubber product which comprises heating rubber and sulfur in the presence of an accelerating agent, said agent comprising a mixture of mercapto-benzo-thiazole-disulfid and diphenyl-guanidine.

7. A vulcanized rubber product obtained by heating rubber and sulfur in the presence of an accelerating agent, said agent comprising a mixture of a benzo-thiazole-disulfid accelerator and an accelerator containing a substituted amino grouping.

8. A vulcanized rubber product obtained by heating rubber and sulfur in the presence of an accelerating agent, said agent comprising a mixture of a mercapto-benzo-thiazole-disulfid accelerator and an accelerator containing a substituted amino grouping.

9. A vulcanized rubber product obtained by heating rubber and sulfur in the presence of an accelerating agent, said agent comprising a mixture of an aryl thiazole disulfid accelerator and an accelerator containing a substituted amino grouping.

10. A vulcanized rubber product obtained by heating rubber and sulfur in the presence of an accelerating agent, said agent comprising a mixture of an aryl thiazole disulfid accelerator and a di-substituted guanidine accelerator.

11. A vulcanized rubber product obtained by heating rubber and sulfur in the presence of an accelerating agent, said agent comprising a mixture of an aryl-thiazole-disulfid accelerator and a di-aryl substituted guanidine accelerator.

12. A vulcanized rubber product obtained by heating rubber and sulfur in the presence of an accelerating agent, said agent comprising a mixture of mercapto-benzo-thiazole disulfid and diphenyl-guanidine.

13. The process of manufacturing a vulcanized rubber product which comprises compounding in one step a rubber stock comprising rubber, sulfur and an accelerating agent, said accelerating agent comprising a mixture of a benzothiaozle-disulfid accelerator and an accelerator containing a substituted amino grouping, and heating to effect vulcanization.

14. The vulcanized rubber product obtained by compounding in one step a rubber stock comprising rubber, sulfur and an accelerating agent, said accelerating agent comprising a mixture of a benzothiazole-disulfid accelerator and an accelerator containing a substituted amino grouping and heating to effect vulcanization.

In testimony whereof I hereunto affix my signature.

WINFIELD SCOTT.